(12) United States Patent
Danielson et al.

(10) Patent No.: US 12,180,056 B2
(45) Date of Patent: Dec. 31, 2024

(54) MONITORING EQUILIBRIUM AND DISPENSEMENT OF A FLUID DISPENSEMENT SYSTEM TO IMPROVE QUALITY AND EFFICIENCY

(71) Applicant: BARTRACK, INC., Sterling, VA (US)

(72) Inventors: Brett Danielson, Sterling, VA (US);
Hunter Markle, Sterling, VA (US);
Grant Hobar, Sterling, VA (US);
Jeffrey T. Cesnik, Sterling, VA (US);
David Atherton, Sterling, VA (US)

(73) Assignee: BARTRACK, INC., Sterling, VA (US)

( * ) Notice: Subject to any disclaimer, the term of this patent is extended or adjusted under 35 U.S.C. 154(b) by 1225 days.

(21) Appl. No.: 16/797,790

(22) Filed: Feb. 21, 2020

(65) Prior Publication Data
US 2021/0261400 A1    Aug. 26, 2021

(51) Int. Cl.
*B67D 1/08* (2006.01)
*B67D 1/00* (2006.01)
(Continued)

(52) U.S. Cl.
CPC ......... *B67D 1/0888* (2013.01); *B67D 1/0005* (2013.01); *B67D 1/0855* (2013.01);
(Continued)

(58) Field of Classification Search
CPC .. G01N 29/4436; G01N 29/02; G01N 29/024; G01N 2291/02433; G01N 2021/1708; G01N 2291/0228; G01N 2291/02836; G01N 2291/02881; B67D 1/0888; B67D 1/0005; B67D 1/0884;
(Continued)

(56) References Cited

U.S. PATENT DOCUMENTS

| | | |
|---|---|---|
| 3,935,735 A | 2/1976 | Lee |
| 4,094,445 A | 6/1978 | Bevan |

(Continued)

FOREIGN PATENT DOCUMENTS

| | | |
|---|---|---|
| GB | 2327748 A | 2/1999 |
| WO | 2009032875 A2 | 3/2009 |

(Continued)

OTHER PUBLICATIONS

First Office Action in Chinese Application No. 202180020671.2, dated Mar. 27, 2024.

*Primary Examiner* — Vishal Pancholi
*Assistant Examiner* — Robert K Nichols, II
(74) *Attorney, Agent, or Firm* — Welsh Flaxman & Gitler LLC (57) ABSTRACT

Certain embodiments of the present disclosure are directed to a method that may include identifying at least one metric for a fluid flowing through a line from a vessel to a dispenser. The method may include identifying a reference value for the at least one metric for the fluid. The method may include performing an analysis of the fluid based on the at least one metric for the fluid. The method may include comparing results of the analysis with the reference value. The method may include performing at least one action based on determining that there has been a change in the at least one metric relative to the reference value.

11 Claims, 4 Drawing Sheets

(51) Int. Cl.
  *G01N 29/02* (2006.01)
  *G01N 29/024* (2006.01)
  *G01N 29/44* (2006.01)
  *B67D 1/12* (2006.01)
  *G01N 21/17* (2006.01)

(52) U.S. Cl.
  CPC .......... *B67D 1/0884* (2013.01); *G01N 29/02* (2013.01); *G01N 29/024* (2013.01); *G01N 29/4436* (2013.01); *B67D 2001/1263* (2013.01); *B67D 2210/00091* (2013.01); *B67D 2210/00104* (2013.01); *B67D 2210/00152* (2013.01); *G01N 2021/1708* (2013.01); *G01N 2291/0228* (2013.01); *G01N 2291/02433* (2013.01); *G01N 2291/02836* (2013.01); *G01N 2291/02881* (2013.01); *G05B 2219/14112* (2013.01)

(58) Field of Classification Search
  CPC .......... B67D 1/0855; B67D 2001/1263; B67D 2210/00152; B67D 2210/00104; G05B 2219/14112
  See application file for complete search history.

(56) References Cited

U.S. PATENT DOCUMENTS

| | | | |
|---|---|---|---|
| 4,676,400 A | 6/1987 | Lamont et al. | |
| 4,949,552 A | 8/1990 | Adams | |
| 5,009,082 A | 4/1991 | Abraham | |
| 5,192,000 A | 3/1993 | Wandrick et al. | |
| 5,372,014 A | 12/1994 | Adams | |
| 5,564,602 A | 10/1996 | Cleland et al. | |
| 5,732,856 A | 3/1998 | Fry | |
| 5,743,107 A | 4/1998 | Kyees | |
| 5,841,027 A | 11/1998 | Scarffe | |
| 5,922,969 A | 7/1999 | Haar | |
| 5,996,842 A | 12/1999 | Riley et al. | |
| 6,431,403 B1 | 8/2002 | Davis | |
| 6,487,873 B2 | 12/2002 | Kyees | |
| 6,609,391 B2 | 8/2003 | Davis | |
| 7,191,614 B2 | 3/2007 | Hess et al. | |
| 7,373,784 B2 | 5/2008 | Haskayne | |
| 7,389,647 B1 | 6/2008 | Abraham | |
| 7,516,623 B2 | 4/2009 | Hall | |
| 7,743,624 B2 | 6/2010 | Schneller et al. | |
| 7,802,445 B2 | 9/2010 | Winters | |
| 7,823,411 B2 | 11/2010 | Gagliano et al. | |
| 9,027,792 B2 | 5/2015 | Watts | |
| 9,823,002 B1 | 11/2017 | Delgado et al. | |
| 9,989,296 B2 | 6/2018 | Pavlik | |
| 10,465,960 B2 | 11/2019 | Prabhakaran | |
| 10,562,750 B2 | 2/2020 | Peirsman et al. | |
| 10,641,532 B2 | 5/2020 | Dalmolin | |
| 10,865,093 B2 | 12/2020 | Yang | |
| 2004/0089371 A1 | 5/2004 | Few | |
| 2004/0256278 A1 | 12/2004 | Kett et al. | |
| 2005/0224075 A1 | 10/2005 | Childers et al. | |
| 2009/0069934 A1 | 3/2009 | Newman et al. | |
| 2009/0173099 A1 | 7/2009 | Gumennyy | |
| 2009/0293989 A1 | 12/2009 | Yang et al. | |
| 2010/0089943 A1 | 4/2010 | Till | |
| 2010/0127017 A1 | 5/2010 | Biesheuvel | |
| 2014/0069279 A1 | 3/2014 | Upston et al. | |
| 2016/0355389 A1 | 12/2016 | Bursey et al. | |
| 2017/0210610 A1 | 7/2017 | Henson et al. | |
| 2017/0337496 A1 | 11/2017 | Jones | |
| 2019/0135607 A1 | 5/2019 | Petermann | |
| 2019/0292037 A1 | 9/2019 | Nicol et al. | |
| 2021/0139309 A1* | 5/2021 | Alpmen | B67D 1/0888 |

FOREIGN PATENT DOCUMENTS

| | | |
|---|---|---|
| WO | 2013177554 A1 | 11/2013 |
| WO | WO2018236758 A1 † | 12/2018 |

* cited by examiner
† cited by third party

MONITORING EQUILIBRIUM AND DISPENSEMENT OF A FLUID DISPENSEMENT SYSTEM TO IMPROVE QUALITY AND EFFICIENCY

FIELD OF THE INVENTION

The present disclosure relates generally to monitoring the equilibrium and dispensement of a fluid dispensement system, and more particularly to a draft beverage system in order to, for example, diagnose potential issues, improve quality of the dispensed fluid, and improve efficiency of the dispensement process.

BACKGROUND

A fluid dispensement system dispenses a fluid often at a metered rate. One example fluid dispensement system is a draft beverage system, such as that which may be installed at a bar, a restaurant, and/or the like. A draft beverage system may be used to dispense draft beverages, such as beer, cider, soda, juice, and/or the like via a tap.

BRIEF SUMMARY

According to some embodiments of the present disclosure, a method may include identifying at least one metric for a fluid flowing through a line from a vessel to a dispenser. The method may include identifying a reference value for the at least one metric for the fluid. The method may include performing an analysis of the fluid based on the at least one metric for the fluid. The method may include comparing results of the analysis with the reference value. The method may include performing at least one action based on determining that there has been a change in the at least one metric relative to the reference value.

In a variant, the method may include monitoring at least one environmental parameter associated with a storage cabinet. In a variant, the method may include analyzing the at least one environmental parameter in conjunction with analyzing at least one signal quality metric. In a variant, the method may include diagnosing at least one potential problem with the fluid based on the at least one environmental parameter and the at least one signal quality metric.

In a variant, the at least one environmental parameter may comprise at least one of line temperature, line pressure, line fluid volume flow rate, fluid color, fluid spectral signature, degassing of the fluid, flow rate of the fluid, barometric pressure within the storage cabinet, humidity within the storage cabinet, ambient temperature within the storage cabinet, and ambient gas concentrations within the storage cabinet. In a variant, the method may include activating at least one electrical or mechanical component configured to modify at least one of: one or more of the at least one environmental parameters, and one or more of the at least one signal quality metrics.

In a variant, the change in the at least one signal quality metric relative to the at least one signal quality metric may indicate an issue with the flow of the fluid in the line. In a variant, the method may include analyzing the change in the at least one signal quality metric relative to the at least one signal quality metric. In a variant, the method may include remotely or autonomously diagnosing a potential issue with the line as a cause of the issue with the flow based on analyzing the change in at least one signal quality metric relative to the at least one signal quality metric. In a variant, the method may include generating a report including information regarding the potential issue.

According to some embodiments of the present disclosure, an apparatus may include at least one processor, and at least one memory including computer program code. The at least one memory and the computer program code are configured to, with the at least one processor, cause the apparatus at least to identify at least one metric for a fluid flowing through a line from a vessel to a dispenser. The apparatus may identify a reference value for the at least one metric for the fluid. The apparatus may perform an analysis of the fluid based on the at least one metric for the fluid. The apparatus may compare results of the analysis with the reference value. The method may perform at least one action based on determining that there has been a change in the at least one metric relative to the reference value.

In a variant, the apparatus may comprise at least one sensor associated with a cabinet, wherein the at least one sensor is configured to monitor the fluid flowing through the line. In a variant, the cabinet may be configured to hold the vessel containing the fluid for dispensing through the line to a dispensing unit. In a variant, the at least one sensor may comprise a first transducer and a second transducer. In a variant, the first transducer and the second transducer may be arranged relative to each other to establish a signal path between the first transducer and the second transducer through the fluid. In a variant, the apparatus may comprise a gateway that is configured to provide information from monitoring the fluid flowing through the line to the gateway for processing. In a variant, the first transducer may be configured to receive a signal from a controller. In a variant, the first transducer may be configured to send a first ultrasonic signal at a first transmission time to the second transducer based on receiving the signal from the controller. In a variant, the second transducer may be configured to receive the first ultrasonic signal at a first receipt time and send a second ultrasonic signal to the first transducer at a second transmission time. In a variant, the first transducer may be configured to receive the second ultrasonic signal at a second receipt time.

In a variant, the at least one sensor and the at least one processor may be further configured to receive information regarding one or more of the first transmission time, the first receipt time, the second transmission time, and the second receipt time. In a variant, the at least one sensor and the at least one processor may be further configured to calculate a first time of flight as the difference in time between the first transmission time and the first receipt time. In a variant, the at least one sensor and the at least one processor may be further configured to calculate a second time of flight as the difference in time between the second transmission time and the second receipt time. In a variant, the at least one sensor and the at least one processor may be further configured to perform one or more actions based on the first time of flight and the second time of flight. In a variant, the at least one sensor may be configured to monitor the at least one metric based on monitoring the fluid.

According to some embodiments of the present disclosure, a system may comprise one or more devices and one or more sensors to identify at least one metric for a fluid flowing through a line from a vessel to a dispenser. The system may identify a reference value for the at least one metric for the fluid. The system may perform an analysis of the fluid based on the at least one metric for the fluid. The system may compare results of the analysis with the reference value. The system may perform at least one action based on determining that there has been a change in the at least one metric relative to the reference value.

In a variant, the one or more devices and the one or more sensors may run diagnostics to diagnose a potential problem with the line. In a variant, the one or more devices and the one or more sensors may provide consolidated information for correlation with point-of-sale data. In a variant, the one or more sensors may comprise at least one environmental sensor comprising at least one temperature sensor located inside of the line to monitor a temperature of the line. In a variant, the one or more devices may comprise at least one gateway that receives information from the at least one temperature sensor regarding the temperature of the line.

In a variant, the one or more devices and the one or more sensors may read the at least one temperature sensor. In a variant, the one or more devices and the one or more sensors may determine whether a temperature of the fluid is consistent with one or more dispensement specifications or a temperature anomaly is associated with producing a system notification. In a variant, the at least one metric may comprise at least one of barometric pressure within a cabinet, humidity within the cabinet, ambient temperature within the cabinet, and ambient gas concentrations within the cabinet.

In a variant, data representing the flow of the fluid through the fluid through the line may be characterized by the at least metric. In a variant, the one or more devices and the one or more sensors may perform one or more actions based on consolidated information or other information to modify the flow of the fluid. In a variant, the one or more sensors may comprise at least one sensor configured to monitor a color of the fluid flowing through the line. In a variant, the one or more devices may receive information from the at least one sensor regarding the color of the fluid flowing through the line.

According to some embodiments of the present disclosure, an apparatus may include at least one processor and at least one memory comprising computer program code. The at least one memory and computer program code may be configured, with the at least one processor, to cause the apparatus at least to perform one or more operations described herein.

According to some embodiments of the present disclosure, an apparatus may include circuitry configured to perform one or more operations described herein.

According to some embodiments of the present disclosure, an apparatus may include means for performing one or more operations described herein.

According to some embodiments of the present disclosure, a computer readable medium comprising program instructions stored thereon for performing one or more operations described herein.

According to some embodiments of the present disclosure, a computer program product may encode instructions for performing one or more operations described herein.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like reference numbers indicating like elements.

DETAILED DESCRIPTION

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, firmware, or in a combined software and hardware implementation that may all generally be referred to herein as a "circuit," "module," "component," or "system." Furthermore, aspects of the present disclosure may take the form of a computer program product embodied in one or more non-transitory computer readable media having computer readable program code embodied thereon.

Any combination of one or more non-transitory computer readable media may be utilized. The non-transitory computer readable media may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium may comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any non-transitory medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on a single computing device, partly on one computing device (e.g., a local computing device) and partly on another computing device (e.g., on a remote computing device, such as server in a data center or on a cloud computing device), or entirely on a remote computing device. In the case of multiple computing devices, the computing devices may be connected to each other through any type of network that includes wired and/or wireless connections, including a local area network ("LAN") or a wide area network ("WAN"), the Internet using an Internet Service Provider, an intranet, a mobile network (e.g., a 3G network, a 4G network, or a 5G network according to Third Generation Partnership Project (3GPP) specifications), and/or the like.

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of computing device, or other programmable data processing apparatus, such that the instructions, which execute via the processor of the computer device, cause the computing device to perform operations specified in the flowchart and/or block diagram blocks. A processor may control one or more devices and/or one or more sensors described herein.

These computer program instructions may also be stored in a non-transitory computer readable medium that, when executed, may direct a computer, other programmable data processing apparatus, or other devices to function in a particular manner, such that the instructions, when stored in the non-transitory computer readable medium, produce an article of manufacture comprising instructions which, when executed, cause a computer to implement the operations specified in the flowchart and/or block diagram blocks. The computer program instructions may also be loaded onto a computer, other programmable instruction execution apparatus, or other device to cause a series of operations to be performed on the computer, other programmable apparatuses, or other devices to produce a computer implemented process, such that the instructions which execute on the computer or other programmable apparatus provide processes for implementing the operations specified in the flowchart and/or block diagram blocks.

Certain embodiments of the present disclosure may monitor flow of a fluid to a dispensing unit, such as the pouring of a draft beer from a tap, in order to, for example, improve the dispensed quality of the dispensed fluid and reduce waste and/or spillage, to identify and reduce dispensement issues such as theft and waste by correlating flow data with point of sale data, and to collect data for analytics, which may improve efficiency and other business operating metrics. For example, a beer manufacturer may produce a beer with an intended amount of carbonation and foam. Certain embodiments described herein may use any of a variety of sensor technologies (e.g., optical, electromagnetic, ultrasonic) to characterize a beverage dispensation line and the flow within it (e.g., the presence and amount of air, carbon dioxide, nitrogen, or oxygen), the volume flow rate of that beverage in that line, the temperature of that beverage in that line, the cleanliness of that beverage line, the presence of unwanted substances in that line (e.g., beer stones, yeast, mold, bacteria), degassing of the fluid, viscosity of the fluid, density of the fluid, a temperature of the fluid, and/or the like. Certain embodiments described herein may use this characterization along with other measurements collected from other sensors (e.g., measurements of ambient conditions, such as temperature, humidity, or pressure, from environmental sensors) to improve the dispensed quality of the beverage by providing feedback and alerts. Using this information, certain embodiments may identify quality problems with the pour of a beverage, including whether there is too much foam, and may determine possible underlying causes of the quality problems, such as the temperature in the cooler or the pressure in the beverage lines. In some embodiments, sensors, such as light sensors and/or optical sensors, may be configured to detect and/or identify particulate matter, such as dust, pollen, glass, dirt, metal shavings, and other impurities within the fluid. As an example, particulate matter may be detected and/or identified based upon the size of the particulate matter from readouts of the sensors. Additionally or alternatively, sensors may be calibrated to operate with a particular fluid. For example, sensors may be calibrated according to a predetermined color, carbonation level, viscosity, specific weight, specific volume, specific gravity, pH, and other fluid properties. In addition to fluid calibration, sensor functionality may be improved with calibration for particular environmental factors, such as the color of the line and/or brightness in a bar, since such environmental factors can affect sensor function with respect to, for example, monitoring color of the fluid.

In addition, certain embodiments may improve and maintain system equilibrium by integrating with dispensement system components, such as gas regulation and mixing systems. Further, certain embodiments may correlate the sensor-monitored flow and environmental data with point-of-sale information to detect theft of beverage volume (e.g., volume that was poured but not sold) and incorrect pouring techniques (e.g., waste), to evaluate business operations, such as which beverages yield the highest revenue or profit, or to determine quality in a particular context or timeframe. In this way, certain embodiments may improve business operations by identifying beverages whose sale could improve business operation metrics.

In the example context of a draft beverage system that dispenses beer, certain embodiments of the present disclosure may use ultrasonic transducers to measure the flow rate of beer as it travels from the keg to the tap. Using an ultrasonic transducer may avoid the drawbacks associated with traditional turbine flow meters and other more expensive or less accurate ways of measuring and monitoring flow rate. For example, the drawbacks of using turbine flow meters include their mechanical nature, e.g., moving parts that are subject to wear and failure, a need for periodic recalibration based on wear and change of mechanical characteristics, and a tendency to reduce the dissolved gas concentration of (i.e., degas) the metered fluid. In addition, turbine flow meters designed for fluids are generally unsuitable for partially or completely empty lines and often yield incorrect readings and may be subject to damage in such cases. Electromagnetic flow measurement is relatively expensive and also utilizes more power than an ultrasonic sensor, which can be made to operate on merely a coin cell battery.

Certain embodiments described herein may include flow sensors through which the metered fluid flows. While non-intrusive measurement is possible, it is generally inferior because relevant engineering properties that affect measurement (e.g., material-dependent speed of sound or geometry-dependent cross-sectional area) typically vary over time and place, and impact the precision of the associated measurements. For example, the lines typically used for draft beverage distribution are flexible and would flex, compress, or otherwise deform if a typical non-intrusive clamp-on meter were to be used. A consistent, quality-controlled, and calibrated environment for such properties, provided by a sensor through which fluid flows, yields more precise measurements.

While certain embodiments may be described with reference to a draft beverage system (e.g., carbonated beer dispensed from a keg stored in a cooler via a tap), certain embodiments may be applicable to the dispensement or distribution of any carbonated or non-carbonated beverage or non-beverage fluid, such as nitro-pour coffee, carbonated soda, or water used for a manufacturing process, for which monitoring of temperature, pressure, flow rate, or other measurements discussed herein, may be performed. Certain embodiments described in the present disclosure are merely provided as example implementations of the embodiments described herein. Persons of ordinary skill in the art will readily appreciate that there are numerous possible embodiments beyond those described herein and that certain embodiments are applicable to various contexts beyond those provided as examples herein.

Figure 1:
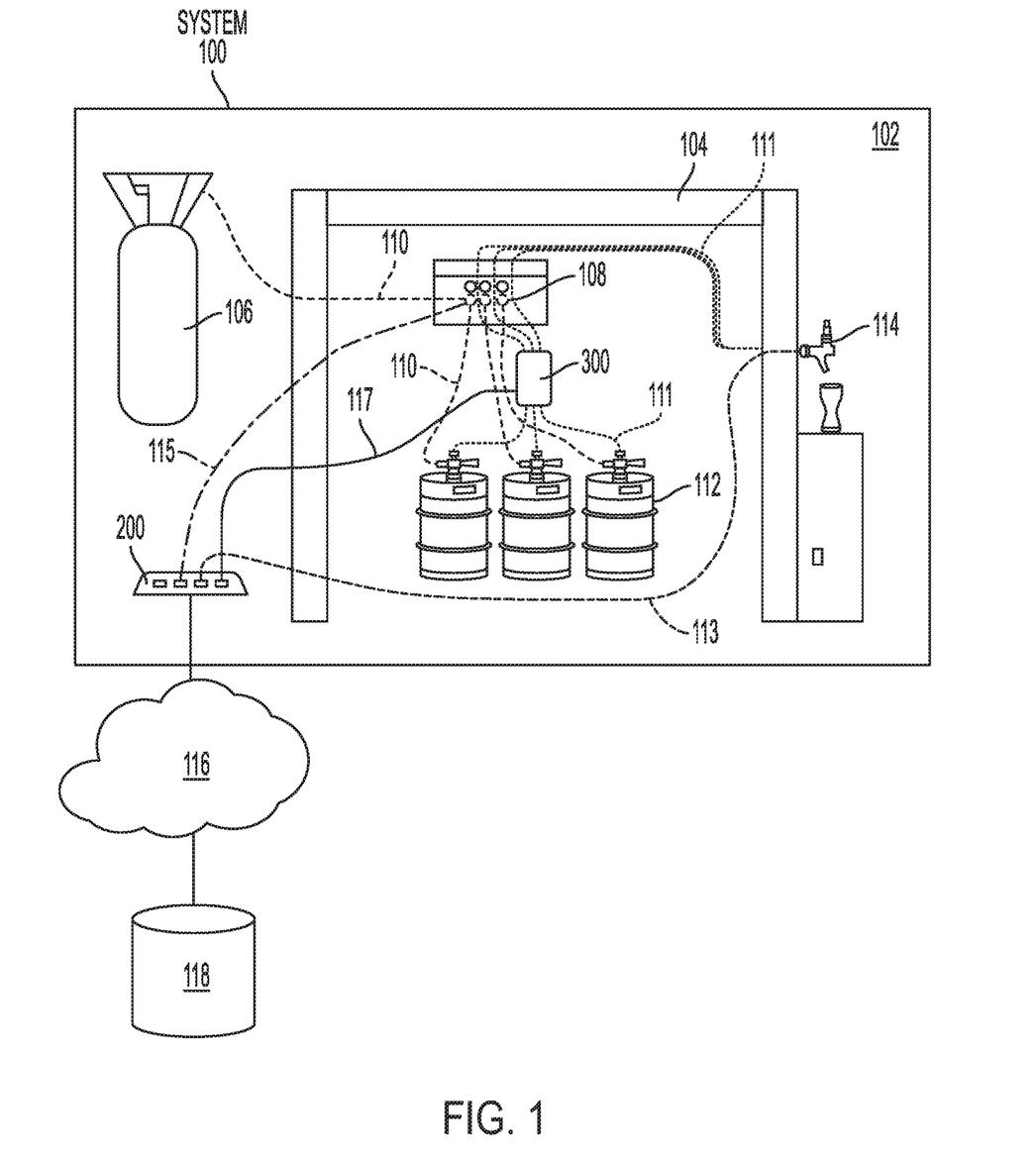
FIG. 1 depicts a diagram of an example beverage monitoring system according to some embodiments of the present disclosure.

FIG. 1 depicts a diagram of an example beverage monitoring system according to some embodiments of the present disclosure. For example, FIG. 1 depicts a beverage monitoring system, in the context of a larger system 100, for monitoring equilibrium of and dispensement using a draft beverage system. The system 100 may include an establishment location 102 (e.g., a bar or restaurant), an environmentally-controlled cabinet 104 (e.g., a cooler, a refrigerator) used to maintain the desired environmental characteristics of the dispensed beverages (e.g., temperature, pressure) contained therein and containing various distribution components, a pressurized gas source 106, pressurized gas regulators 108, pressurized gas distribution lines 110, beverage distribution lines 111, beverage vessels 112 (e.g., kegs, barrels, etc.), and beverage dispensers 114 (e.g., taps). The beverage monitoring system, which may perform operations described herein, may include one or more components local to the system 100 or remote from the system 100. For example, the beverage monitoring system may include a gateway 200 installed at the establishment location 102, and its data connections 113, 115, 117 with the beverage dispensers 114, pressurized gas regulators 108, and sensor assemblies 300, respectively. The gateway 200 may be connected via a network 116 to off-site components 118 (e.g., server devices). Operations of the beverages monitoring system and/or devices or components thereof are described in more detail elsewhere herein.

As explained above, FIG. 1 is provided as an example. Other examples are possible according to some embodiments.

Figure 2A:
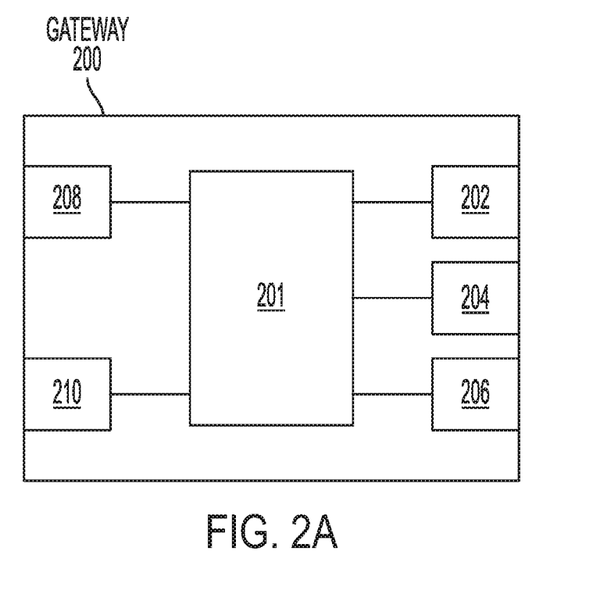
FIG. 2A depicts a functional diagram of an example local controller (gateway) according to some embodiments of the present disclosure.

FIG. 2A depicts a functional diagram of an example local controller (gateway) according to some embodiments of the present disclosure. For example, FIG. 2A depicts the gateway 200 of the beverage monitoring described with respect to FIG. 1. In some embodiments the gateway 200 may be used to monitor and collect environmental and flow metrics for a beverage during dispensement from taps, may serve as a router between various devices, and may serve as a gateway between the devices located on-site at the establishment location 102 and off-site, e.g., the off-site components 118. The gateway 200 may be connected to a draft beverage system, where, for example, kegs of beer are stored in a cooler and poured from a tap after flowing through a line from the keg to the tap. The gateway 200 may include a processor 201, a network interface 202 connected via connection 113 to dispensers 114 (e.g., taps), a network interface 204 connected via connection 117 to sensor assemblies 300, an audio/visual control network interface 206 connected to disc jockey (DJ) or other audio/visual booths at the establishment location 102, an interface 208 for serial communication, and an Ethernet network interface 210.

The gateway network interfaces 202, 204, 206, and 210 may be controlled and signaled separately to reduce packet latency. The gateway 200 may serve as a router between the three network interfaces. The gateway 200 may receive data from a sensor network via network interface 204 and may process that data to determine that a pour has started, and then may send that information to the tap network via network interface 202 so that the tap 114 can visually indicate the volume poured and, in certain embodiments, automatically close the tap 114 when a selected volume has been poured. The gateway may also implement alternative communications interfaces such as cellular network modems to provide connectivity where wired Ethernet or wireless Ethernet (WiFi) is unavailable or otherwise undesirable.

The gateway 200 may communicate with each tap via the tap network interface 202 and each tap 114 may be daisy chained together. The taps 114 may be powered externally. The gateway 200 may know which of the taps 114 was requesting a pour, and in turn, may prioritize the associated flow measurement packets so the tap 114 has real-time, low-latency data that may be used to control a valve within the tap. For example, if 3 out of 15 taps 114 are actively pouring beer, those traffic streams may take priority over data (e.g., the gateway 200 may only bridge traffic from the sensor network to the tap network for the 3 active taps while caching other data for taps 114 that are not in use). This provides various advantages as data latency may create uncertainty or error as to how much beer has been poured. Reducing latency may result in a corresponding reduction in pour uncertainty or error. As an illustration of this, an increase in latency between collecting flow measurements and delivering those measurements to the tap 114 to control the valve of the tap 114 may result in increased over pour of a beverage. As a result, the gateway 200 of certain embodiments may decrease waste, which may save costs that would otherwise be incurred as a result of over pouring.

Figure 2B:
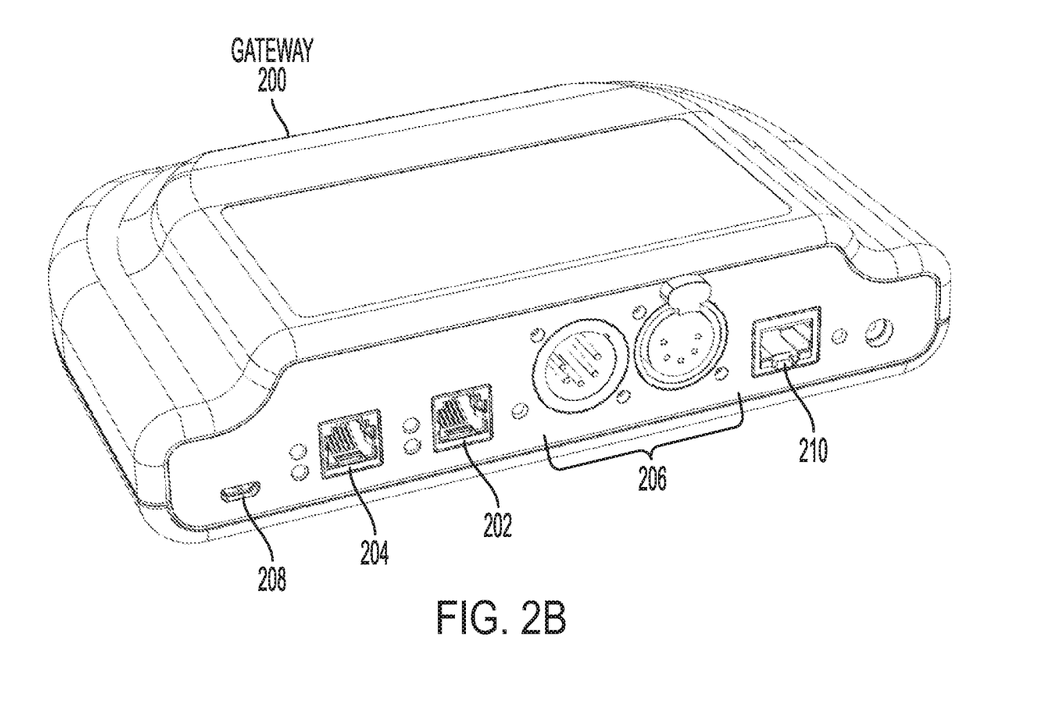
FIG. 2B depicts an external view of the example gateway of FIG. 2A according to some embodiments of the present disclosure.

The audio/visual network interface 206 may be used to synchronize lighting control systems to the draft beer taps 114 or coordinate other special effects or audio/visual effects. For example, the gateway 200 may provide data to cause lighting arrangements to be activated and/or music to be played when certain taps 114 are in use. Additionally, or alternatively, this network interface may be used to activate light or sound alarms when certain issues are detected by the beverage monitoring system, as described elsewhere herein. FIG. 2B depicts an external view of the example gateway of FIG. 2A according to some embodiments of the present disclosure.

As explained above, FIGS. 2A and 2B are provided merely as examples. Other examples are possible according to some embodiments.

Figure 3A:
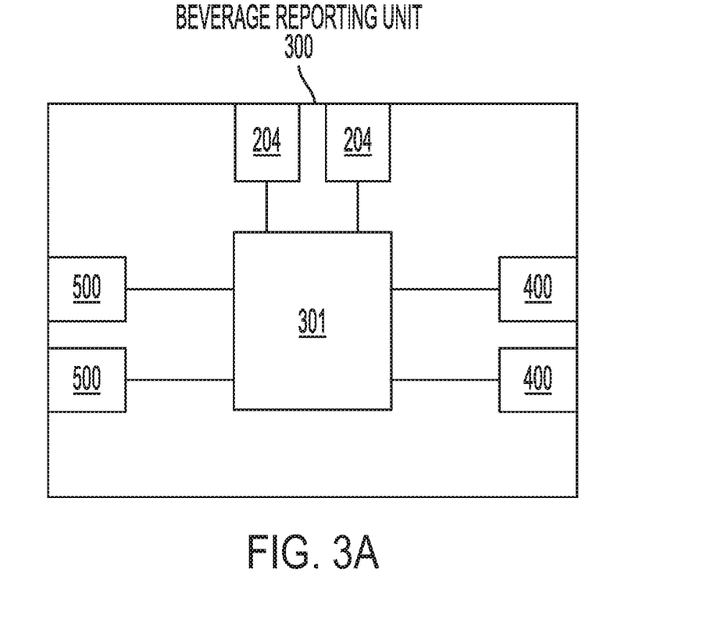
FIG. 3A depicts a functional diagram of an example sensor assembly (e.g., a beverage reporting unit (BRU)) according to some embodiments of the present disclosure.
Figure 3B:
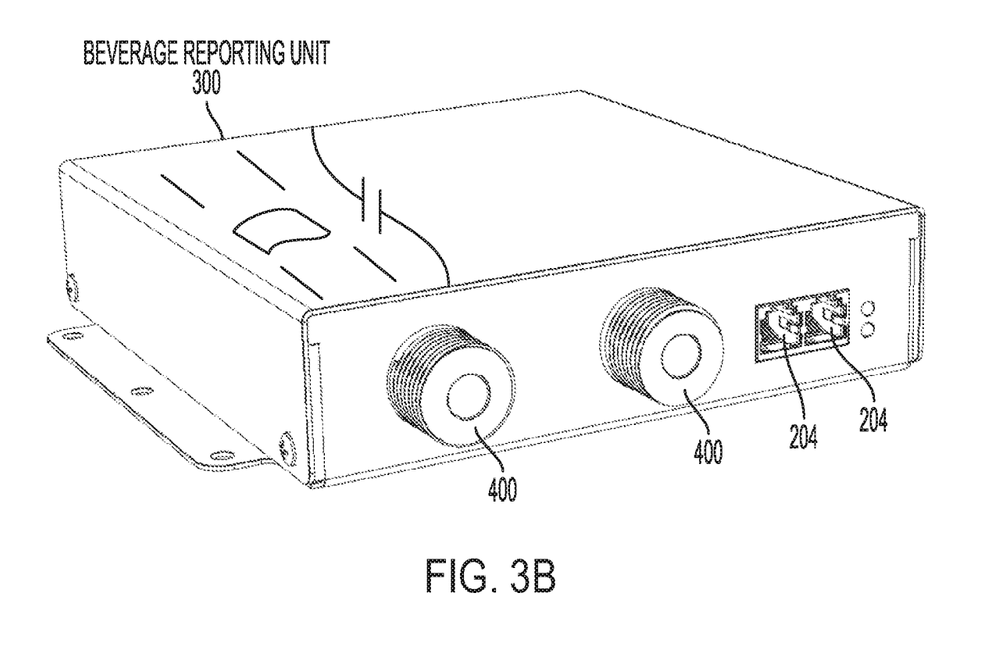
FIG. 3B depicts an external view of the example sensor assembly of FIG. 3A according to some embodiments of the present disclosure.

FIG. 3A depicts a functional diagram of an example sensor assembly (e.g., a beverage reporting unit (BRU)) according to some embodiments of the present disclosure. For example, FIG. 3A depicts a diagram of a sensor assembly 300 of the beverage monitoring system. The sensor assembly 300 may house sensors and may provide locally collected data to the gateway 200 for further processing. The sensor assembly 300 may include a processor 301, sensor network interfaces 204 (e.g., one for connecting upstream towards the gateway 200, and one for connecting downstream towards the next daisy-chained sensor assembly 300, if present), one or more flow sensors 400 and one or more environmental sensors 500. FIG. 3A depicts two flow sensors, but any suitable number of flow sensors may be used depending on the number of beverage lines to be measured. For example, a bar may have 8 taps (with 8 lines). In this case, the sensor assembly 300 may include 8 flow sensors 400. To accommodate additional flow sensors 400 or sensor locations, the sensor assembly 300 may be connected to one or more other sensor assemblies 300 via the appropriate sensor network interface 204 (e.g., upstream or downstream). The number of flow sensors 400 may correspond to the number of fluid lines to be distinctly measured, which typically corresponds to the number of taps or dispensing units but may involve more complicated configurations with line splitters. Certain embodiments may include one sensor 400 per tap or dispensing unit. FIG. 3B depicts an external view of the example sensor assembly of FIG. 3A according to some embodiments of the present disclosure.

As explained above, FIGS. 3A and 3B are provided merely as examples. Other examples are possible according to some embodiments.

Figure 4A:
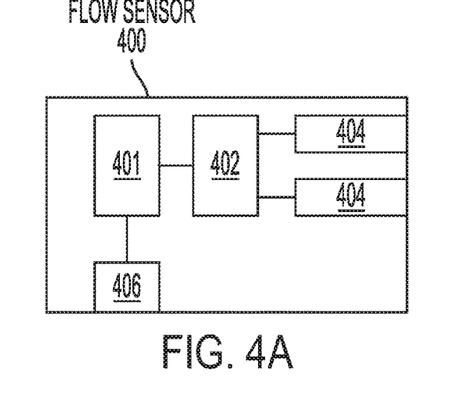
FIG. 4A depicts a functional diagram of an example flow sensor according to some embodiments of the present disclosure.

FIG. 4A depicts a functional diagram of an example flow sensor according to some embodiments of the present disclosure. For example, FIG. 4A depicts a diagram of a flow sensor 400. The flow sensor 400 may include a processor 401, an ultrasonic front-end processor 402, two ultrasonic transducers 404, and temperature sensor 406. The ultrasonic front-end processor 402 may communicate with processor 401 via a flow pulse interface, or in accordance with alternative embodiments, via serial data communication, and/or pulse width modulation (PWM) or any combination of these methods. PWM of flow rate can potentially send flow data with higher resolution than a simple pulse flow interface and with lower latency. A serial data interface can potentially send flow and other measurement data much faster than a simple pulse flow or PWM interface and with lower latency than either.

As described below in more detail, in an example embodiment, flow sensor 400 may include two ultrasonic transducers 404 and may use a time of flight mechanism to measure the flow rate of the beverage being dispensed. The ultrasonic front-end processor 402 may cause an ultrasonic signal to be sent through the fluid 420, which may be traveling through a channel 450, at a known nominal speed along a signal path of known length 440 in one direction, from one ultrasonic transducer 404 to the other ultrasonic transducer 404, and then to be sent back again in the opposite direction. The difference between the signal travel time in each direction may be directly correlated to fluid flow speed because the measured speed of that signal is increased or decreased from its nominal speed by that flow speed, as that signal travels with or against the flow, respectively. Certain example embodiments may incorporate a correction for the effect of different temperatures, different alcohol concentrations, or different compositions (as characterized by spectral signatures) on the nominal speed of sound in the fluid.

Figure 4B:
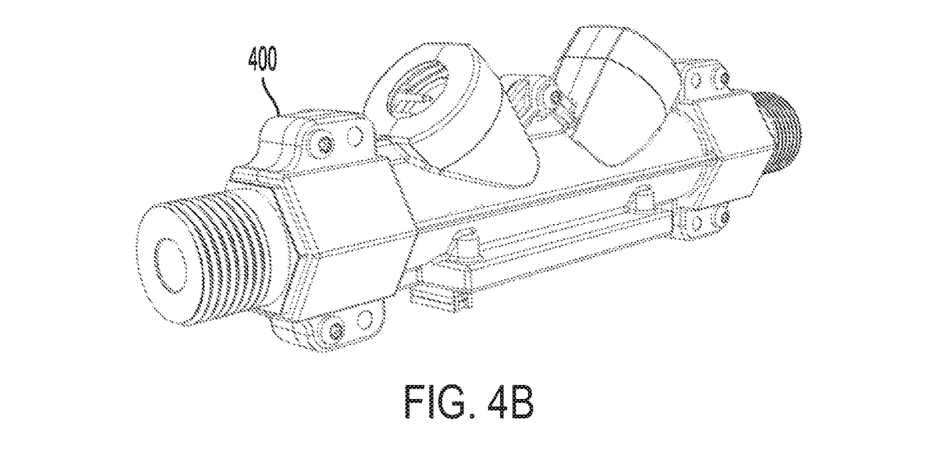
FIG. 4B illustrates an external view of the example flow sensor of FIG. 4A according to some embodiments of the present disclosure.
Figure 4C:
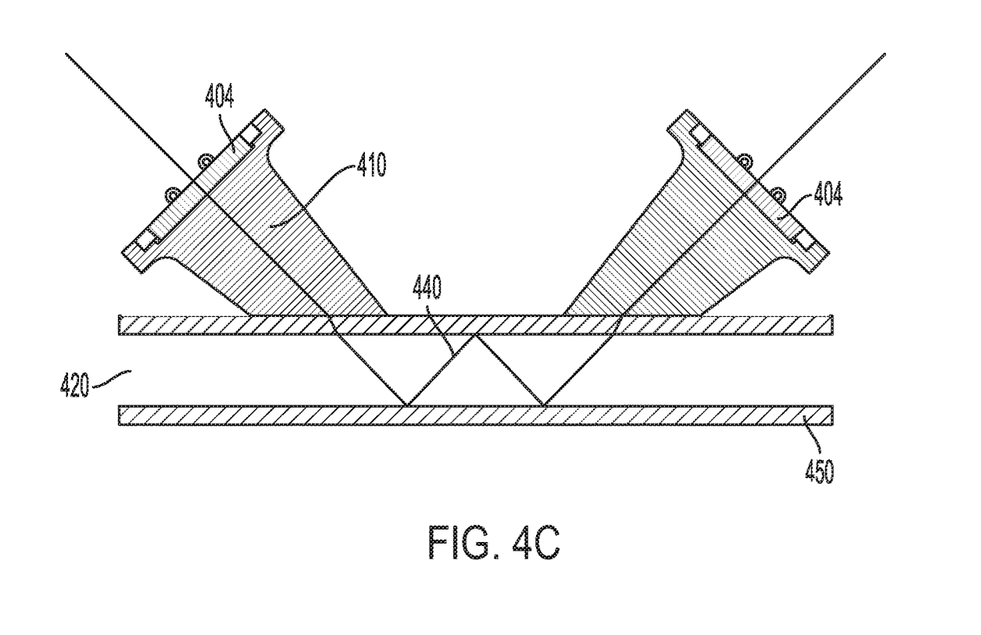
FIG. 4C illustrates a cutaway view of the example flow sensor of FIG. 4B according to some embodiments of the present disclosure.

FIG. 4B illustrates an external view of the example flow sensor 400 of FIG. 4A according to some embodiments of the present disclosure. FIG. 4C illustrates a cutaway view of the example flow sensor 400 of FIG. 4B according to some embodiments of the present disclosure, to highlight the ultrasonic signal path. As illustrated in FIG. 4C, the first ultrasonic transducer 404 and the second ultrasonic transducer 404 may be arranged relative to each other to establish a signal path between them through the monitored fluid, considering the material properties the components traversed by the signal path (i.e., transducer mounts 410, fluid flow channel 450 wall, and monitored fluid 420), and the first ultrasonic transducer 404 and the second ultrasonic transducer 404 may be piezo transducers operating in a range from 100 kHz to 5 MHz. In certain embodiments, the sensor may be placed inside the tap or dispensing unit itself.

The ultrasonic transducers 404 of the present disclosure may measure flow rate and may also provide baseline signal quality metrics under normal operating conditions. For example, if the channel 450 is full or substantially full of beer or other fluid 420, the transducer may provide a baseline signal strength. When that signal strength decreases, such decrease can be used to determine the amount of air or other gases in the line. This determination may be used to initiate notice to bar personnel that the system may have become unbalanced, the attached keg may be empty, or there may be a leak in the line or other issue with the supply gases. For example, the beverage monitoring system may perform this determination and may output a notification to a point-of-sale system or another computing device, may trigger an alarm or activate a light, and/or the like. Based on other sensor data points, the beverage monitoring system may determine the origin of the unbalanced condition. For example, if the detected temperature and flow rate are to specifications and detected ambient pressure in the cabinet is low, then the system pressurization may have to be increased. For another example, if the detected temperature is higher than specification, then the environmental control (e.g., thermostat) may have to be used to reduce the temperature and the system pressurization may have to be decreased until the temperature reaches specification. The present disclosure may also distinguish between a decrease in signal strength or quality (e.g., indicating air bubbles) and complete loss of signal or degradation of a signal below a predetermined threshold (e.g., indicating that a line is empty). In some embodiments, the beverage monitoring system may determine when a vessel, such as a keg, is empty. For example, the beverage monitoring system may determine that a keg is empty by detecting a threshold amount of gas in the line, the size of the keg, and/or the like. In various embodiments, the beverage monitoring system may determine when a line is being cleaned. For example, the beverage monitoring system may determine that a line is being cleaned based on particular flow patterns and/or compositions of fluid in the line. Furthermore, in certain embodiments, the beverage monitoring system may monitor vessel and/or bottle filling at a supply location. According to several embodiments, the beverage monitoring system may dose a fluid with one or more chemicals to achieve a particular concentration of chemicals in the fluid.

The flow sensor 400 may monitor line temperature, which may impact quality of the pour, as the pour occurs, using temperature sensor 406. For example, a bar may store kegs of beer in a cooler and there may be thermal equilibrium between the temperature of the beer in the keg and the ambient temperature of the cooler where the beverage line is located. When flow of beer starts, the temperature in the line, as compared to the ambient temperature of the cooler, should remain stable. In another example, a beer keg may be stored outside where the ambient temperature is warmer than the ambient temperature of the cooler. If the keg is placed in the cooler, and beer starts flowing through the line before the beer in the keg has cooled to the ambient temperature of the cooler and the line, the temperature in the line will increase towards the temperature of the beer in the keg when flow starts.

In certain embodiments, the temperature sensor 406 may be a semiconductor temperature sensor, thermocouple, a non-contact infrared sensor, or similar device fixed to the inside or the outside of the sensor pipe using glue or any other suitable attachment mechanism. The data monitored by the temperature sensor 406 may be collected at the same time as the flow data from the flow sensor 400, and may be collected first by the sensor assembly 300 and then forwarded to the gateway 200. Those data may be then reported to off-site components 118 for storage and further analysis. Additionally, the flow sensor 400 may incorporate any combination of an illumination source, a light sensor, color sensor, multi-channel spectral sensor, or laser to monitor various aspects of the beverage color and/or beverage spectral signature or even to identify air or other gases passing through the lines. For example, the illumination source may illuminate the beverage as it is flowing through a line, and a light sensor, color sensor, multi-channel spectral sensor, laser, and/or the like may be used to analyze the color to determine a change in the flowing beverage (e.g., a keg change), line cleanliness compared with a baseline, the presence of beer stones, the gases present, and/or the like. In certain embodiments it may be possible to apply active or passive spectroscopy techniques using these same sensors to further analyze the characteristics of the beverage passing through the sensor. For example, flow sensor 400 may utilize spectroscopy techniques to analyze for contaminants in the beverage or to assess the composition of the beverage. In certain embodiments it may be possible to introduce acoustic sensors to gather additional properties of the fluid, e.g., density, and perform additional analyses such as the derivation of alcohol percentage. In other embodiments it may be possible to characterize the fluid passing through the sensor using spectral analysis techniques (based on comparison to or inference from pre-measured known spectral signatures of other fluids) to automatically tune certain calibration parameters to the specific fluid being dispensed. It may also be possible to alert that actual contents of a keg may differ from expected contents of the keg (e.g., tapping a stout beer when the system expects a lager).

The sensor assembly 300 may include one or more environmental sensors 500. The environmental sensors 500 may measure and monitor cooler barometric pressure, humidity, ambient temperature, as well as oxygen, nitrogen, carbon dioxide, or other ambient gas concentrations (e.g., to promote employee safety and prevent asphyxiation in the event of a major gas leak). For example, the environmental sensors may promote employee safety in various ways (e.g., by triggering an alarm in the cooler, actuating a motor to open a vent in the cooler, or by triggering a fan to turn on) based on a detected ambient gas concentration. Based on barometric pressure, the system may calculate the gas pressurization adjustments necessary to properly balance the draft beer system and maintain the desired amount of dissolved gases in the beverage, may determine an amount of adjustment in one or more mechanical component needed to cause the gas pressurization adjustments, and may trigger actuation of one or more mechanical components to cause the gas pressurization adjustments (e.g., by sending an instruction to the one or more mechanical components). In certain embodiments, a gas regulator 108 may be connected via connection 115 to the gateway via the control network interface (not shown with respect to the gateway 200) and may be capable of remote operation. For example, this may allow adjustment of the gas pressure on beverage lines remotely, without a need for a technician to physically adjust the gas pressure, thereby improving beverage dispensing performance and quality.

This information may be used in combination with the data from the temperature sensor. For example, the beverage monitoring system may determine if there is condensation or abnormal moisture levels in the cooler (e.g., uncontrolled atmosphere is reaching the cooler through a hole in the cooler or an open door), or if there is a difference between the cooler temperature and the beer temperature (e.g., beer has not been cooled long enough to reach thermal equilibrium with cooler), which lead to pouring with too much foam, e.g., waste. For another example, the beverage monitoring system may determine that a certain full keg holds enough beer to pour 60 pints, but upon accessing the point-of-sale system, the beverage monitoring system may determine that there were only recorded sales of 50 pints of the beer by the time the keg is empty. With the data from the flow sensor, temperature sensor, and environmental sensor, the beverage monitoring system may analyze and determine whether the conditions were creating foamy beer and may output this information to a computer (e.g., associated with a manager or bartender) to help prevent future waste. Additionally, or alternatively, the beverage monitoring system may monitor for the occurrence of similar conditions and may trigger an alarm or output a notification indicating that environmental conditions which previously led to waste are present again. In certain embodiments, the beverage monitoring system may determine a modification to flow rate, temperature, or an environmental factor that is needed to prevent the waste (e.g., an increase/decrease in temperature or humidity of a cooler or other room), and may output this information or may activate one or more flow dispensing devices or environmental control devices to adjust these measurements. For example, the beverage monitoring system may turn on/off an air-conditioning unit or a heater (otherwise adjust a thermostat), may turn on/off a humidifier or de-humidifier, and/or the like.

Alternatively, if analysis of the data from the flow sensors, temperature sensors, and environmental sensors determines that the conditions would not lead to foam or other waste, the beverage monitoring system may determine that someone is pouring beers without charging for them or is using incorrect pouring technique and may output this information to a computer (e.g., of a manager of a bar). In this way, certain embodiments facilitate detection and prevention of theft and waste.

Other examples of controls incorporated into sensors are possible. For example, a temperature sensor that measures the temperature of the liquid in the line, may incorporate the ability to control the temperature of the cooler in which the fluid is flowing from or have another control mechanism to adjust the temperature of the liquid in the line. Including controllers in conjunction with one or more of the sensors may provide for an autonomously balanced draft system based on system parameters (e.g., line length, line drop, beverage dispensed, other factors discussed in this specification), environmental or other conditions identified by the sensors (e.g., temperature changes, changes in weather patterns creating barometric pressure variations contributing to flow anomalies) that may detect abnormalities or other changes and may make adjustments to correct or improve the operating conditions of the system automatically and autonomously.

In addition, other actions are possible by certain embodiments. For example, systems described herein may generate a report that includes information related to a result of analyzing data, that identifies a source of an issue of a flow of fluid, forecasts for fluid dispensement, compares net profits, and/or the like. For specific examples, the reports may identify per-keg efficiency or other per-keg metrics, an expected remaining life for a keg, that a particular keg and/or line is experiencing a leak, and/or the like.

As described above, certain embodiments may use one sensor per beer line (or other suitable fluid or beverage line). A bar or restaurant with a draft beer system may have any number of taps depending on the needs of their business. Certain embodiments may include locating several flow sensors together in a sensor assembly 300, and then networking the sensor assemblies together via the sensor network interfaces 204 to streamline the installation process and reduce costs. For example, a sensor assembly 300 may be installed into a first beverage cooler. The sensor assembly 300 may contain two flow sensors in an example embodiment, as shown in FIG. 3B. A second beverage cooler may contain another sensor assembly, and so forth for each of the beverage coolers at the establishment location 102. The sensor assemblies 300 may be daisy chained together via sensor network interfaces 204 to communicate with each other (or connected via any other suitable mechanism to allow communication). The last connection from the sensor assemblies 300 may connect to a gateway 200. This network of sensor assemblies 300 may use a networking protocol for sensor assembly 300 communications and data collection. This is designed for low latency communication to the gateway 200.

The gateway 200 may function as a protocol converter for sensor network data and may be connected via network 116 to off-site resources 118. The gateway 200 may query one or more of the sensor assemblies 300 ("pull"), or optionally one or more of the sensor assemblies 300 may report directly to the gateway 200 ("push"). The sensor assembly 300 may provide the data from its flow sensors and environmental sensors. The gateway 200 may then consolidate and process the data using algorithms to analyze the data, including to find the start and stop of flow (e.g., start of flow may be determined when flow exceeds a threshold flow rate and stop of flow may be determined when flow is below the threshold flow rate). The gateway 200 may submit this data to off-site resources 118 for retention and further processing, including correlating the flow and environmental data with point-of-sale system data and characterizing the flow (e.g., as beverage dispensement, leakage, system cleaning) based on whether the flow satisfies pre-determined threshold flow rates, based on sensor data and other information (e.g., bar-provided business hours and scheduled/activated cleaning procedures). Thus, the flow of data contemplated by certain embodiments may involve the sensors monitoring and measuring flow of the beer and associated environmental conditions as it flows to the tap to be poured. Those sensors may provide that data to the sensor assembly 300. The sensor assembly 300 may report that data to the gateway 200, and the gateway 200 may provide that data to off-site resources 118 via the network 116.

The gateway 200 may poll (e.g., periodically, according to a schedule, or in a continuous manner) the sensor network interface 204 to request data and may receive packets from the sensor assemblies 300 representing flow (e.g., flow in milliliters since last packet) and environmental data. Using this data, the gateway 200 may perform processing to determine if a fluid flow is occurring (e.g., different types of flows, such as a pour, a leak, line cleaning, and/or the like may be identified based on whether the flow rate satisfies one or more pre-determined thresholds). The gateway 200 may constantly monitor the flow (e.g., in a streaming manner). The gateway 200 may run a derivative function over the flow rate. When the gateway 200 detects a sharp rise relative to some threshold (e.g., predetermined or dynamically determined threshold), it may start accumulating data until it detects the end of the pour. In this way, the accumulation of relevant data may be sent to off-site resources 118, e.g., cloud resources for storage and/or further analysis. The accumulated data may be stored in the gateway 200, in some embodiments.

Diagnostics can also be run on the data on the gateway 200 or on the off-site resource 118. For example, the beverage monitoring system of certain embodiments may remotely diagnose potential problems (e.g., system overpressurization, cooler temperature anomalies) without the need for personnel at the enterprise location 102 to make a service call, e.g., the beverage monitoring system may remotely diagnose that beer is being wasted due to a pressure system imbalance, that a cooler temperature is not being maintained, and/or the like.

From time to time, it may become necessary to update the operational firmware or calibration parameters within the sensor or its corresponding cabinet controller circuitry containing various other sensor communications interfaces. For the case where firmware needs to be remotely updated, a "bootloader" may be implemented within the beverage sensor itself and/or the sensor cabinet controller communicating with it that is able to receive an "application" firmware payload along with specific commands to update itself. This way, various bug fixes or enhancements may be deployed without physical user intervention. In the case where calibration coefficients may need to be updated remotely, the bootloader or application firmware may process and store updated coefficients in local nonvolatile memory to continuously enhance the performance and calibration of the sensor over time as more and more data is collected and analyzed. Dynamically updated calibration coefficients may lead to a more linear and/or more accurate response of temperature sensors, multi-channel spectral sensors, or flow sensors and the like.

In addition to the thermal equilibrium described above with respect to the temperature of beer in the keg and ambient temperature in the cooler, pressure equilibrium may also be a factor in identifying and/or diagnosing issues with dispensement of a beer. For example, line pressure is a function of multiple variables, including the length and diameter of the beer line, the material the beer line is made of, regulated gas pressure, the beverage viscosity, and the flow rate of the beer. A draft beer system may be equalized line to line at a set, predetermined flow rate, such as 1 gallon per minute. There may be line length differences or barometric pressure differences that affect the flow rate and change it from the set, predetermined flow rate. In addition, de-gassing can be caused by low or high pressure, or high temperatures. Consolidating flow sensor data and environmental sensor data (e.g., temperature) in the gateway 200 or off-site resources 118 for analysis may allow a beverage monitoring system to analyze various types of data and how the factors are affecting optimum beer flow in order to remotely diagnose problems and diagnose potential problems earlier by being able to identify the root problem from the consolidated data.

As is apparent from the above description, certain example embodiments provide several technological improvements, enhancements, and/or advantages over existing technological processes. For example, one benefit of some example embodiments is the improvement in quality and efficiency of dispensement of fluids, such as draft beverages, and a reduction in waste associated with the dispensement. Accordingly, the use of some example embodiments results in improved functioning of a fluid dispensement system and, therefore, constitute an improvement at least to the technological field of monitoring fluid dispensement, among others.

Some example embodiments of the present disclosure may be comprised of the various components, e.g., a gateway, a sensor assembly, and a dispenser, physically separate from each other. In certain embodiments, one or more of these components can combined into a single component, e.g., a gateway and a sensor assembly may be combined together into one component providing the combined operations described with respect to each component above.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

We claim:

1. A fluid dispensement system for integration with a beverage dispensing system including a storage cabinet used to maintain desired environmental characteristics of a dispensed beverage contained therein, a pressurized gas source, pressurized gas regulators, pressurized gas distribution lines, beverage distribution lines, beverage vessels, and beverage dispensers, the fluid dispensement system comprising:
   a gateway including a processor, a network interface adapted for connection to the beverage dispensers, a network interface connected to one or more sensors, and at least one memory including computer program code; and
   one or more sensors including one or more flow sensors and one or more environmental sensors, the one or more flow sensors comprise a first transducer and a second transducer, wherein the first transducer and the second transducer are arranged relative to each other on a same side of a fluid flow channel to establish a signal path between the first transducer and the second transducer through the fluid;
   wherein the fluid dispensement system identifies at least one metric for a fluid flowing through a line from a vessel to a dispenser; identifies a reference value for the at least one metric for the fluid; performs an analysis of the fluid based on the at least one metric for the fluid; compares results of the analysis with the reference value; and performs at least one action based on determining that there has been a change in the at least one metric relative to the reference value.

2. The fluid dispensement system of claim 1, wherein the fluid dispensement system runs diagnostics to diagnose a potential problem with the line.

3. The fluid dispensement system of claim 1, wherein the fluid dispensement system provides consolidated information for correlation with point-of-sale data.

4. The fluid dispensement system of claim 1, wherein the one or more sensors comprise at least one environmental sensor comprising at least one temperature sensor located inside of the beverage distribution line to monitor a temperature of the line, and the gateway receives information from the at least one temperature sensor regarding the temperature of the beverage distribution line.

5. The fluid dispensement system of claim 4, wherein the fluid dispensement system reads the at least one temperature sensor, and determines whether a temperature of the fluid is consistent with one or more dispensement specifications or a temperature anomaly is associated with producing a system notification.

6. The fluid dispensement system of claim 1, wherein the one or more sensors comprise at least one environmental sensor located within the cabinet and the at least one metric comprises at least one of barometric pressure within the cabinet, humidity within the cabinet, ambient temperature within the cabinet, and/or ambient gas concentrations within the cabinet.

7. The fluid dispensement system of claim 1, wherein data representing the flow of the fluid through the beverage distribution line is characterized by the at least metric.

8. The fluid dispensement system of claim 1, wherein the fluid dispensement system performs one or more actions based on consolidated information or other information to modify the flow of the fluid through the beverage distribution line.

9. The fluid dispensement system of claim 1, wherein the one or more sensors comprises at least one sensor configured to monitor a color of the fluid flowing through the beverage distribution line, wherein the gateway receives information from the at least one sensor configured to monitor a color regarding the color of the fluid flowing through the beverage distribution line.

10. The system according to claim 1, wherein the first transducer sends a first ultrasonic signal at a first transmission time to the second transducer and the second transducer receives the first ultrasonic signal at a first receipt time and sends a second ultrasonic signal to the first transducer at a second transmission time, and the first transducer receives the second ultrasonic signal at a second receipt time.

11. The system according to claim 1, wherein the one or more sensors measure at least one environmental parameter selected form the group consisting of beverage distribution line temperature, beverage distribution line pressure, fluid color, fluid spectral signature, fluid dissolved gas concentrations, barometric pressure within the cabinet, humidity within the cabinet, ambient temperature within the cabinet, and ambient gas concentrations within the cabinet.

* * * * *